United States Patent

Halsey et al.

Patent Number: 5,719,454
Date of Patent: Feb. 17, 1998

[54] SPRING LIFE IMPROVEMENT

[75] Inventors: Mickey L. Halsey, Mexico; Steven J. Holden, Manlius; Stephen L. Lessie, Jamesville, all of N.Y.

[73] Assignee: Carrier Corporation, Syracuse, N.Y.

[21] Appl. No.: 643,672

[22] Filed: May 6, 1996

[51] Int. Cl.$^6$ ............... F16C 33/66; H02K 7/08; H02K 5/16
[52] U.S. Cl. ............................... 310/90; 384/517
[58] Field of Search .................. 310/90; 384/517, 384/518, 519, 563, 583

[56] References Cited

U.S. PATENT DOCUMENTS

| | | | |
|---|---|---|---|
| 1,851,561 | 6/1932 | Baninger | 384/620 |
| 2,502,874 | 4/1950 | Moore | 384/517 |
| 2,523,983 | 9/1950 | Arms | 308/184 |
| 4,173,376 | 11/1979 | Standing et al. | 384/517 |
| 4,227,755 | 10/1980 | Lundberg | 384/518 |
| 4,730,995 | 3/1988 | Dewhirst | 384/517 |
| 5,062,347 | 11/1991 | Allais et al. | 89/37.07 |
| 5,411,388 | 5/1995 | Soderlund | 384/517 |
| 5,433,536 | 7/1995 | Berling | 384/620 |

FOREIGN PATENT DOCUMENTS

| | | | |
|---|---|---|---|
| 0303148A | 2/1989 | European Pat. Off. | |
| 2807411 | 8/1978 | Germany | 384/517 |
| 62-56615 | 3/1987 | Japan | 384/517 |
| 627260 | 8/1949 | United Kingdom | 384/517 |
| WO 16108A | 12/1990 | WIPO | |

Primary Examiner—Clayton E. LaBalle

[57] ABSTRACT

A backing ring has a reduced diameter portion surrounded by a spring which engages the backing ring and a stop to normally keep the stop and backing ring separated by a small distance while maintaining a desired bias on the bearing system which is engaged by the backing ring. Movement of the bearing is limited by the small distance which also limits flexure and therefore improves the fatigue life of the spring.

3 Claims, 2 Drawing Sheets

SPRING LIFE IMPROVEMENT

BACKGROUND OF THE INVENTION

Two tapered roller bearings support the respective ends of the rotor of an induction motor. Typically one bearing is in a fixed position in the housing and the outer race of this bearing is in direct contact with the bottom of the bearing bore. It is critical that the outer race of each bearing maintains direct contact with the rolling elements. The second bearing must be axially positioned such that this direct contact is maintained in both bearings. The manufacturing tolerances associated with the housing, shaft, and bearings, are taken up by inserting a spring behind the second bearing. Preloading the spring provides an axial force acting through the bearings and shaft that keeps the bearings in the desired contact. The rotor experiences a start up transient that applies an axial magnetic force on the rotor which initially acts as the plunger or core of a solenoid. The transient force acts against the spring bias acting against the bearings and temporarily partially expels the rotor from the bore before the magnetic forces center the rotor under normal operation. It follows that that transient force deflects the spring and excessive deflection over a large number of cycles can cause spring failure.

SUMMARY OF THE INVENTION

The present invention limits the deflection of the spring under transient force to thereby increase spring life. In addition to limiting the spring physically by reducing the potential movement, the movement can also be restricted by increasing the spring bias by increasing the initial loading.

It is an object of this invention to improve spring fatigue life.

It is an additional object of this invention to provide a desired spring bias together with limited spring movement.

It is another object of this invention to limit spring deflection. These objects, and others as will become apparent hereinafter, are accomplished by the present invention.

Basically, a spring acting directly on a bearing and providing a desired bias has been replaced by a spring acting on the bearing through a backing ring and having a limited amount of deflection while providing a desired bias.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
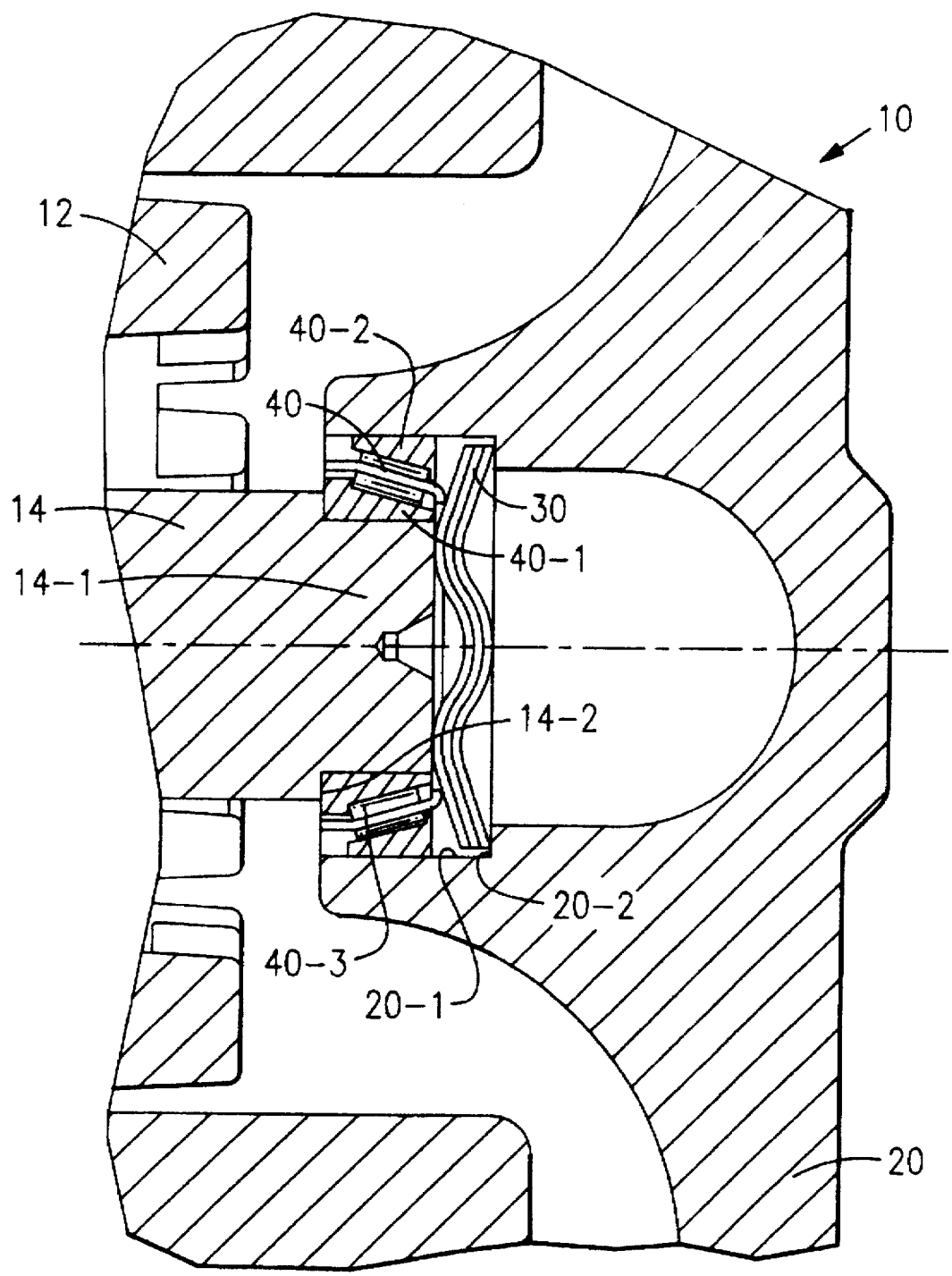
FIG. 1 is a partial, partially sectioned view showing the PRIOR ART spring biasing structure.

In FIG. 1 the numeral 10 generally designates a motor such as is used for driving a refrigeration compressor and including the PRIOR ART biasing arrangement. Rotor 12 is shrunk fit or otherwise suitably attached to shaft 14 and rotates as a unit therewith. Shaft 14 has a reduced portion 14-1 which is separated from the rest of shaft 14 by shoulder 14-2. Motor housing 20 has a bore 20-1 ending at shoulder 20-2. Spring 30 is located in bore 20-1 and is in engagement with shoulder 20-2 and, preferably is made up of a plurality of turns of a wavy spring. Tapered roller bearing 40 includes an inner race 40-1, and an outer race 40-2 as well as bearing elements 40-3. Inner race 40-1 is interference fit or otherwise suitably attached to the reduced shaft portion 14-1. Outer race 40-2 is received in bore 20-1 and is biased into contact with shoulder 14-2 by spring 30.

In operation, initially powering the stator (not illustrated) causes it to act as the coil of a solenoid and to cause the rotor 12 and integral shaft 14 to act as a core and move to the right, as illustrated in FIG. 1. Movement of the rotor 12 and shaft 14 causes movement of bearing 40 to the right, as illustrated in FIG. 1, causing the compression of spring 30 with the fully compressed height of spring 30 limiting the movement. The shaft 14 and rotor 12 will become centered upon steady state operation. However, this extreme movement of the spring 30 with each operating cycle can cause spring fatigue.

Figure 2:
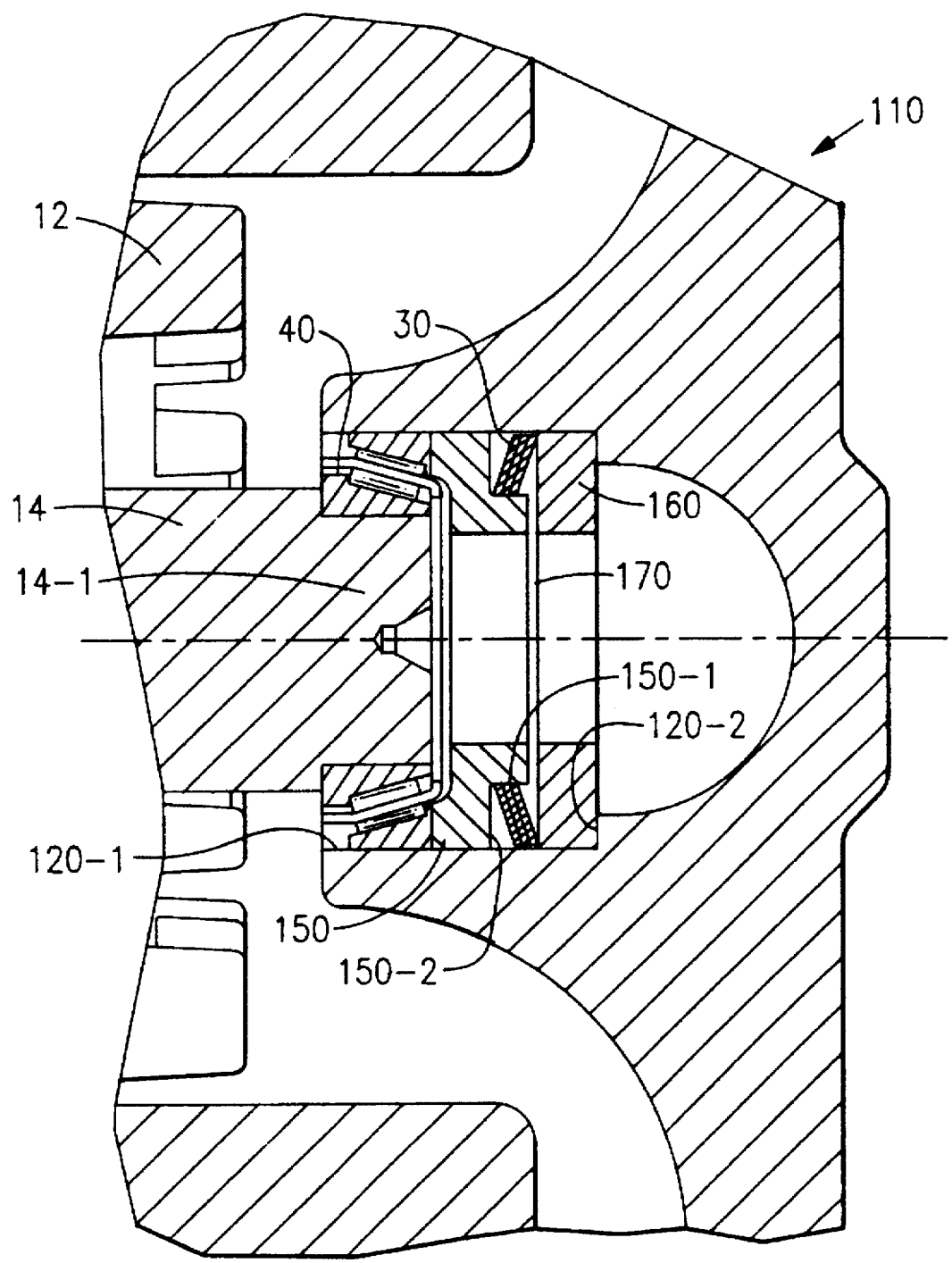
FIG. 2 is a partial sectional view showing the biasing structure of the present invention.

Motor 110 differs from motor 10 in that bore 120-1 is deeper than bore 20-1, in that backing ring 150 is located between bearing 40 and spring 30 and, in that stop 160 is located in bore 120-1 in biased engagement with shoulder 120-2. Backing ring 150 has a reduced diameter portion 150-1 nominally extending through spring 30 which surrounds reduced diameter portion 150-1 and engages shoulder 150-2. All of the other structure is the same. Normally, there is a small gap 170 between reduced diameter portion 150-1 of backing ring 150 and stop 160 on the order of 0.02 inches with spring 30 acting to keep them separated. This small gap 170 is chosen by determining a flexure distance for the spring 30, which would have a nominal infinite cycle life for the design life of the device. Gap 170 is necessary to maintain a biased engagement due to the bias of spring 30 but cycle life decreases with increasing gap distance which is preferably held to less than 0.05 inches. In operation, spring 30 only acts in flexure over the gap 170 between the reduced diameter portion 150-1 of backing ring 150 and stop 160 such that upon start up, movement of the shaft 14 and rotor 12 to the right, as illustrated in FIG. 2, is opposed by spring 30 and the resultant movement of the rotor 12 shaft 14, bearing 40 and backing ring 150 against the bias of spring 30 ends with the closing of gap 170 by the engagement of backing ring 150 with stop 160 thereby greatly limiting the flexure of spring 30 with a resultant increase in spring fatigue life. Shaft 14 and rotor 12 will become centered upon steady state operation reestablishing gap 170.

Since the present invention seeks to limit the deflection of spring 30, the associated components should be designed and manufactured such that the size of the gap 170 is controlled within the limits discussed above.

Although a preferred embodiment of the present invention has been illustrated and described, other changes will occur to those skilled in the art. It is therefore intended that the scope of the present invention is to be limited only by the scope of the appended claims.

What is claimed is:

1. In a motor having a rotor mounted on a shaft subject to transient axial movement wherein said shaft has a reduced portion which is rotatably supported by a tapered bearing located in a bore and subject to said transient axial movement, an improved spring deflection limiting device comprising:

a backing ring located in said bore and having one side engaging said bearing and a second side having a reduced portion;

a stop located in said bore and having one side engaging a shoulder formed in said bore and a second side facing said reduced portion of said backing ring and normally spaced therefrom by a small distance;

a spring engaging said second side of said backing ring and said second side of said stop and surrounding said reduced portion of said backing ring and biasing said backing ring and said stop apart to maintain said small distance whereby when said shaft is subject to transient axial movement, said movement is limited to said small distance.

2. The spring deflection limiting device of claim 1 wherein said small distance is on the order of 0.02 inches.

3. The spring deflection limiting device of claim 1 wherein said small distance is less than 0.05 inches.

* * * * *